(12) United States Patent
Liu et al.

(10) Patent No.: US 11,624,753 B2
(45) Date of Patent: Apr. 11, 2023

(54) ROTATIONAL SPEED SENSOR, MANUFACTURING METHOD THEREOF, DRIVING METHOD THEREOF AND ELECTRONIC DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yu Liu, Beijing (CN); Liguang Deng, Beijing (CN); Xiaoliang Fu, Beijing (CN); Shuqian Dou, Beijing (CN); Zhiqiang Fan, Beijing (CN); Ting Tian, Beijing (CN); Yawen Zhang, Beijing (CN); Dayong Zhou, Beijing (CN); Dong Zhang, Beijing (CN); Youcai Yang, Beijing (CN); Zhongjun Wang, Beijing (CN); Yongjie Han, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 727 days.

(21) Appl. No.: 16/671,513

(22) Filed: Nov. 1, 2019

(65) Prior Publication Data
US 2020/0141963 A1 May 7, 2020

(30) Foreign Application Priority Data
Nov. 1, 2018 (CN) .......................... 201811294309.0

(51) Int. Cl.
*G01P 3/36* (2006.01)
*G01J 3/02* (2006.01)
(Continued)

(52) U.S. Cl.
CPC .............. *G01P 3/36* (2013.01); *G01J 3/0218* (2013.01); *G01J 3/0275* (2013.01); *G02F 1/1337* (2013.01); *G02F 1/1339* (2013.01)

(58) Field of Classification Search
CPC ... G01P 3/36; G01P 3/44; G01J 3/0218; G01J 3/0275; G02F 1/1337; G02F 1/1339; G02F 1/1313; G02F 1/1333; G01C 19/00
See application file for complete search history.

(56) References Cited

U.S. PATENT DOCUMENTS 4,720,174 A * 1/1988 Baker .................. G02F 1/1326
349/196
4,721,352 A * 1/1988 Sorin .................... G02F 1/1326
349/196
(Continued)

FOREIGN PATENT DOCUMENTS

CN 104488016 * 4/2015 ....... G02F 1/133345

*Primary Examiner* — Mohamed K Amara
(74) *Attorney, Agent, or Firm* — Brooks Kushman P.C.

(57) ABSTRACT

A rotational speed sensor, a manufacturing method thereof, a driving method thereof, and an electronic device are provided. The rotational speed sensor includes liquid crystal cell, rotational speed sensing module and rotational speed determining module; rotational speed sensing module is configured to convert rotational speed into voltage signal and apply voltage signal to liquid crystal cell; and at least a part of optical signal propagation module of rotational speed determining module is located in liquid crystal cell. Spectrum drift time of optical signal propagated in optical signal propagation module is variable as refractive index of liquid crystal molecules in liquid crystal cell changes; optical signal transmitting module in rotational speed determining
(Continued)

module transmits optical signal to optical signal propagation module; optical signal receiving module in rotational speed determining module receives optical signal propagated by optical signal propagation module and analyzes spectrum to determine rotational speed.

19 Claims, 2 Drawing Sheets

(51) Int. Cl.
    *G02F 1/1337*     (2006.01)
    *G02F 1/1339*     (2006.01)

(56) References Cited

U.S. PATENT DOCUMENTS

| | | | | |
|---|---|---|---|---|
| 4,730,171 A * | 3/1988 | So | G02F 1/0115 | 385/2 |
| 4,749,258 A * | 6/1988 | Baker | G02F 1/1326 | 349/196 |
| 5,586,205 A * | 12/1996 | Chen | G02B 6/14 | 349/1 |
| 6,361,180 B1 * | 3/2002 | Iimura | G02B 6/0065 | 362/616 |
| 6,603,902 B1 * | 8/2003 | So | G02F 1/0115 | 385/140 |
| 8,805,136 B2 * | 8/2014 | El-Sherif | G02B 6/02066 | 359/240 |
| 8,860,897 B1 * | 10/2014 | Anderson | G02F 1/1326 | 349/17 |
| 10,775,167 B2 * | 9/2020 | Liu | G02B 6/032 | |
| 2001/0046352 A1 * | 11/2001 | Ohta | G02B 6/02085 | 385/37 |
| 2002/0090192 A1 * | 7/2002 | O'Brien | G02B 6/266 | 385/9 |
| 2002/0131694 A1 * | 9/2002 | So | G02F 1/0115 | 385/11 |
| 2003/0223074 A1 * | 12/2003 | Chen | G01K 11/32 | 356/477 |

\* cited by examiner

ROTATIONAL SPEED SENSOR, MANUFACTURING METHOD THEREOF, DRIVING METHOD THEREOF AND ELECTRONIC DEVICE

CROSS-REFERENCE TO RELATED APPLICATION

This application claims priority to Chinese Patent Application No. 201811294309.0 filed on Nov. 1, 2018, which is incorporated herein by reference in its entirety.

TECHNICAL FIELD

The present disclosure relates to the field of sensor technologies, and in particular to a rotational speed sensor, a manufacturing method thereof, a driving method thereof, and an electronic device.

BACKGROUND

According to the operation principles, the rotational speed sensors can be mainly divided into: Hall-type rotational speed sensor, photoelectric rotational speed sensor and capacitive rotational speed sensor. The Hall-type rotational speed sensor is based on the principle of electromagnetic induction, which converts the rotational speed of the rotating shaft into a corresponding induced electromotive force, and determines the rotational speed by detecting the change of the induced electromotive force. The photoelectric rotational speed sensor is configured to transmit infrared light to an object, a rotational speed of which is to be measure, convert a rotational speed of the object into a square wave pulse signal of frequency after the infrared light is reflected or transmitted, and obtain the rotational speed of the object based on the square wave pulse signal. The capacitive rotational speed sensor includes a rotating plate and two fixed plates. During operation, an object, a rotational speed of which is to be measure, drives the rotating plate to rotate, which affects the change of the capacitance between the fixed plate and the movable plate, and the rotational speed can be measured by detecting the change of the capacitance.

Although the above-mentioned rotational speed sensors can measure the rotational speed, there are some defects. The Hall-type rotational speed sensor is susceptible to electromagnetic interference and has poor frequency response; the photoelectric rotational speed sensor has high environmental requirements and is susceptible to interference by ambient light; and the capacitive rotational speed sensor is bulky and susceptible to environmental interference. Therefore, currently the rotational speed sensors have the disadvantages of being easily interfered by external conditions and having poor operation performance.

SUMMARY

A first aspect of the present disclosure provides a rotational speed sensor, comprising a liquid crystal cell, a rotational speed sensing module, and a rotational speed determining module; wherein the rotational speed sensing module is configured to convert a rotational speed into a voltage signal and apply voltage signal on the liquid crystal cell; the rotational speed determining module includes: an optical signal propagation module, wherein at least a part of the optical signal propagation module is located in the liquid crystal cell, an optical signal is totally reflected when being propagated in the optical signal propagation module, and a drift time of a spectrum corresponding to the optical signal propagated in the optical signal propagation module is variable as a refractive index of liquid crystal molecules in the liquid crystal cell changes; an optical signal transmitting module, configured to transmit the optical signal to the optical signal propagation module; and an optical signal receiving module, configured to receive the optical signal propagated by the optical signal propagation module and analyze the spectrum of the optical signal as received to determine the rotational speed.

In some embodiments, the optical signal transmitting module is located at an optical signal input end of the optical signal propagation module, the optical signal receiving module is located at an optical signal output end of the optical signal propagation module, the optical signal input end and the optical signal output end of the optical signal propagation module are located outside the liquid crystal cell, and an optical signal propagation portion between the optical signal input end and the optical signal output end of the optical signal propagation module is located inside the liquid crystal cell.

In some embodiments, the optical signal propagation module comprises a single-mode optical fiber, a core of at least a part of the single-mode optical fiber located inside the liquid crystal cell is exposed, and a core of another part of the single-mode optical fiber is covered by a cladding.

In some embodiments, the single-mode optical fiber is a U-shaped single-mode plastic optical fiber, and a core of a curved portion of the U-shaped single-mode plastic optical fiber is exposed.

In some embodiments, the optical signal receiving module comprises: a photoelectric converting module, configured to receive the optical signal propagated by the optical signal propagation module and convert the optical signal as received into an electrical signal; a signal processing module, configured to process the electrical signal; and a spectrum analyzing module, configured to perform spectrum analysis on the processed electrical signal to determine the rotational speed.

In some embodiments, the liquid crystal cell comprises: a first substrate and a second substrate opposite to each other; a sidewall of the liquid crystal cell between the first substrate and the second substrate, wherein the sidewall of the liquid crystal cell defines a receiving space of the liquid crystal cell; a first alignment layer on a surface of the first substrate facing the second substrate; and a second alignment layer on a surface of the second substrate facing the first substrate, wherein the liquid crystal molecules are between the first alignment layer and the second alignment layer; the rotational speed sensing module comprises: a first electrode plate and a second electrode plate on two sides of the liquid crystal cell; and a conversion device connected to the first electrode plate and the second electrode plate, wherein the conversion device is configured to connect an object to be measured, convert the rotational speed into the voltage signal, and apply the voltage signal to the first electrode plate and the second electrode plate, and the rotational speed is a rotational speed of the object to be measured; the first electrode plate is on a side of the first substrate facing away from the second substrate; and the second electrode plate is on a side of the second substrate facing away from the first substrate.

In some embodiments, two mounting holes are disposed on the sidewall of the liquid crystal cell, the optical signal input end and the optical signal output end of the optical signal propagation module protrude out of the sidewall of the liquid crystal cell through the two mounting holes respectively, and fixing glue for fixing the optical signal propagation module is provided in each of the two mounting holes.

In some embodiments, the conversion device comprises: a rotating shaft, configured to connect the object to be measured; a magnet unit, configured to generate a magnetic field; and a toroidal coil, disposed on the rotating shaft, wherein the toroidal coil is synchronously rotatable with the rotating shaft, and the toroidal coil cuts magnetic lines of force in the magnetic field when rotating with the rotating shaft.

In some embodiments, the conversion device comprises: a housing; a first slip ring, wherein a rotor of the first slip ring is connected to an end of the toroidal coil; a second slip ring, wherein a rotor of the second slip ring is connected to the other end of the toroidal coil; a first brush respectively connected to the stator of the first slip ring and the first electrode plate; and a second brush respectively connected to the stator of the second slip ring and the second electrode plate; the magnet unit is on an inner wall of the housing; and the rotating shaft comprises a first end, a second end and a rotating shaft body between the first end and the second end, the first end and the second end respectively protrude from the housing and are respectively rotatably connected to the housing, the first end is further configured to be connected to the object to be measured, and the rotating shaft body is located inside the housing.

In some embodiments, the magnet unit comprises: a U-shaped permanent magnet, wherein the toroidal coil is located between two magnetic poles of the U-shaped permanent magnet; and magnetic conductive blocks adsorbed on the magnetic poles of the U-shaped permanent magnet, wherein the magnetic conductive blocks extend in an axial direction of the rotating shaft.

In some embodiments, the drift time of the spectrum corresponding to the optical signal propagated in the optical signal propagation module includes a drift time of a transmission peak or a loss peak.

In some embodiments, the optical signal receiving module is configured to analyze the spectrum of the optical signal to obtain the drift time of the spectrum, and determine the rotational speed based on a predetermined correspondence between rotational speed and drift time and the drift time.

Based on the above technical solutions of the rotational speed sensor, a second aspect of the present disclosure provides an electronic device, comprising the rotational speed sensor as described above.

Based on the above technical solutions of the rotational speed sensor, a third aspect of the present disclosure provides a method of manufacturing a rotational speed sensor, comprising: forming an optical signal propagation module; forming a liquid crystal cell, and assembling the optical signal propagation module and the liquid crystal cell, such that at least a part of the optical signal propagation module is located in the liquid crystal cell, wherein an optical signal is totally reflected when being propagated in the optical signal propagation module, and a drift time of a spectrum corresponding to the optical signal propagated in the optical signal propagation module is variable as a refractive index of liquid crystal molecules in the liquid crystal cell changes; forming a rotational speed sensing module, and connecting the rotational speed sensing module to the liquid crystal cell, wherein the rotational speed sensing module is configured to convert a rotational speed into a voltage signal and apply the voltage signal on the liquid crystal cell; providing an optical signal transmitting module at an optical signal input end of the optical signal propagation module, wherein the optical signal transmitting module is configured to transmit the optical signal to the optical signal propagation module; and providing an optical signal receiving module at an optical signal output end of the optical signal propagation module, wherein the optical signal receiving module is configured to receive the optical signal propagated by the optical signal propagation module, and analyze the spectrum of the optical signal as received to determine the rotational speed.

In some embodiments, the forming the optical signal propagation module comprises: providing a single-mode optical fiber comprising a core and a cladding covering the core; and removing the cladding of at least a part of the single-mode optical fiber within the liquid crystal cell to expose the core.

In some embodiments, the single-mode optical fiber is a single-mode plastic optical fiber, and before removing the cladding of the single-mode optical fiber, the method further comprises: forming the single-mode plastic optical fiber into a U-shaped single-mode plastic optical fiber; the removing the cladding of the at least a part of the single-mode optical fiber within the liquid crystal cell comprises: removing the cladding of a curved portion of the U-shaped single-mode plastic optical fiber.

In some embodiments, the forming the liquid crystal cell and assembling the optical signal propagation module and the liquid crystal cell comprises: providing a first substrate, and forming a first alignment layer on the first substrate; providing a second substrate, and forming a second alignment layer on the second substrate; providing a sidewall of the liquid crystal cell, wherein the sidewall of the liquid crystal cell is provided with two mounting holes, and the sidewall the liquid crystal cell defines a receiving space of the liquid crystal cell; placing the single-mode optical fiber inside the sidewall of the liquid crystal cell, wherein an input end and an output end of the single-mode optical fiber respectively protrude out of the sidewall of the liquid crystal cell through the two mounting holes, and a part of the single-mode optical fiber where the core is exposed is located inside the sidewall of the liquid crystal cell; filling the two mounting holes with a fixing glue for fixing the single-mode optical fiber; assembling the first substrate and the sidewall of the liquid crystal cell to form a receiving box, wherein the first alignment layer of the first substrate faces the single-mode optical fiber; dropping the liquid crystal molecules into the receiving box; and assembling the second substrate and the receiving box such that the second alignment layer of the second substrate faces the single-mode optical fiber.

In some embodiments, the forming the rotational speed sensing module and connecting the rotational speed sensing module to the liquid crystal cell comprises: forming a conversion device; forming a first electrode plate on a surface of the first substrate facing away from the second substrate; forming a second electrode plate on a surface of the second substrate facing away from the first substrate; and connecting the conversion device to the first electrode plate and the second electrode plate, wherein the conversion device is configured to convert the rotational speed into the voltage signal and apply the voltage signal to the first electrode plate and the second electrode plate, and the rotational speed is a rotational speed of an object to be measured connected to the conversion device.

Based on the above technical solutions of the rotational speed sensor, a fourth aspect of the present disclosure provides a method of driving a rotational speed sensor, applied to the rotational speed sensor as described above, comprising: converting, by the rotational speed sensing module, a rotational speed into a voltage signal, and applying the voltage signal to the liquid crystal cell; transmitting, by the optical signal transmitting module, an optical signal to the optical signal propagation module, wherein the optical signal is totally reflected when propagated in the optical signal propagation module, and a drift time of a spectrum corresponding to the optical signal is variable as the refractive index of the liquid crystal molecules in the liquid crystal cell changes; and receiving, by the optical signal receiving module, the optical signal propagated by the optical signal propagation module, and analyzing the spectrum of the optical signal as received to determine the rotational speed.

In some embodiments, when the liquid crystal cell comprises a first substrate and a second substrate, and the rotational speed sensing module comprises a first electrode plate, a second electrode plate and a conversion device, the converting, by the rotational speed sensing module, the rotational speed into the voltage signal and applying the voltage signal on the liquid crystal cell comprises: transmitting, by the conversion device, the voltage signal to the first electrode plate and the second electrode plate, after converting the rotational speed into the voltage signal, so as to generate an electric field between the first electrode plate and the second electrode plate.

BRIEF DESCRIPTION OF THE DRAWINGS

The drawings described herein are used to provide a further understanding of the present disclosure, and form a part of the present disclosure. The exemplary embodiments of the present disclosure and the description thereof are for explaining the present disclosure and do not constitute an undue limitation of the present disclosure.

DETAILED DESCRIPTION

To better clarify objects, technical solutions and advantages of embodiments of the present disclosure, the technical solutions in the embodiments of the present disclosure are described clearly and completely in conjunction with drawings in the embodiments of the present disclosure. Apparently, the described embodiments are merely a part of rather than all the embodiments of the present disclosure. All other embodiments obtained by a person ordinary skilled in the art based on the embodiments of the present disclosure without any creative efforts fall within the protection scope of the present disclosure.

In order to further explain a rotational speed sensor, a manufacturing method thereof, a driving method thereof, and an electronic device provided by embodiments of the present disclosure, a detailed description will be provided below with reference to the accompanying drawings.

Figure 1:
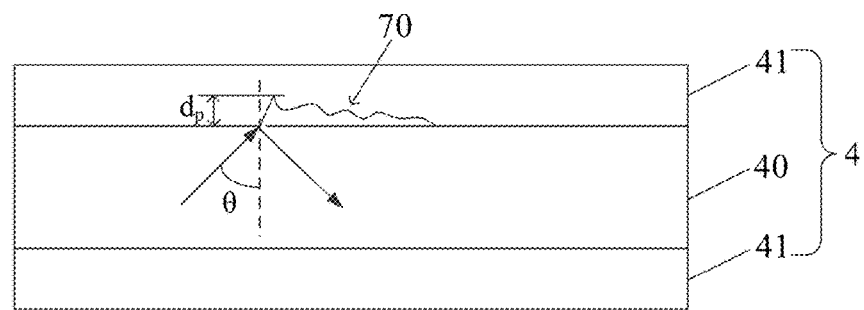
FIG. 1 is a schematic diagram of an optical signal propagated in a single-mode plastic optical fiber to generate an evanescent wave.

Based on the problems raised in the background, inventors of the present disclosure have found through research that, a rotational speed sensor can be fabricated based on the evanescent effect to overcome the above problems. Specifically, the evanescent effect means that, when light is totally reflected from the optically denser medium to the optically thinner medium, there are not only reflected waves but also transmitted waves whose amplitude is exponentially attenuated (i.e., evanescent waves). As shown in FIG. 1, taking propagation of the single-mode plastic optical fiber 4 as an example, the wave propagating along the axial direction of the single-mode plastic optical fiber 4 is an evanescent wave 70, the energy of the evanescent wave 70 is exponentially attenuated, and after a certain distance is propagated, the energy will return to the single-mode plastic optical fiber 4 in the direction of the reflected light. The normal distance where amplitude of the evanescent wave 70 is attenuated to 37% of the interface amplitude is defined as the penetration depth $d_p$ of the evanescent wave 70, which satisfies the following formula (1):

$$d_p = \frac{\lambda}{2\pi} \frac{1}{\sqrt{n_1^2 \sin^2\theta - n_2^2}} \qquad (1)$$

where $\lambda$ is the wavelength of the incident optical signal, $n_1$ is the refractive index of the core 40 of the single-mode plastic optical fiber 4, $n_2$ is the refractive index of the cladding 41, and $\theta$ is the incident angle corresponding to the optical signal. As shown by the formula (1), $d_p$ is related to the refractive index of the propagation medium and the incident angle corresponding to the optical signal. The smaller the incident angle is, and the smaller the difference in refractive index between the core 40 and the cladding 41 is, the greater the penetration depth $d_p$ is. Therefore, the optical signal propagation medium may be placed in another medium having a variable refractive index, and the refractive index of the another medium may be controlled to be correlated with the rotational speed to be measured. In this way, the penetration depth $d_p$ of the evanescent wave 70 generated when the optical signal is propagated in the optical signal propagation medium is related to the rotational speed to be measured. Since the penetration depth $d_p$ of the evanescent wave 70 affects the spectrum of the optical signal, the rotational speed to be measured can be obtained by performing spectrum analysis on the optical signal propagated through the optical signal propagation medium.

Figure 2:
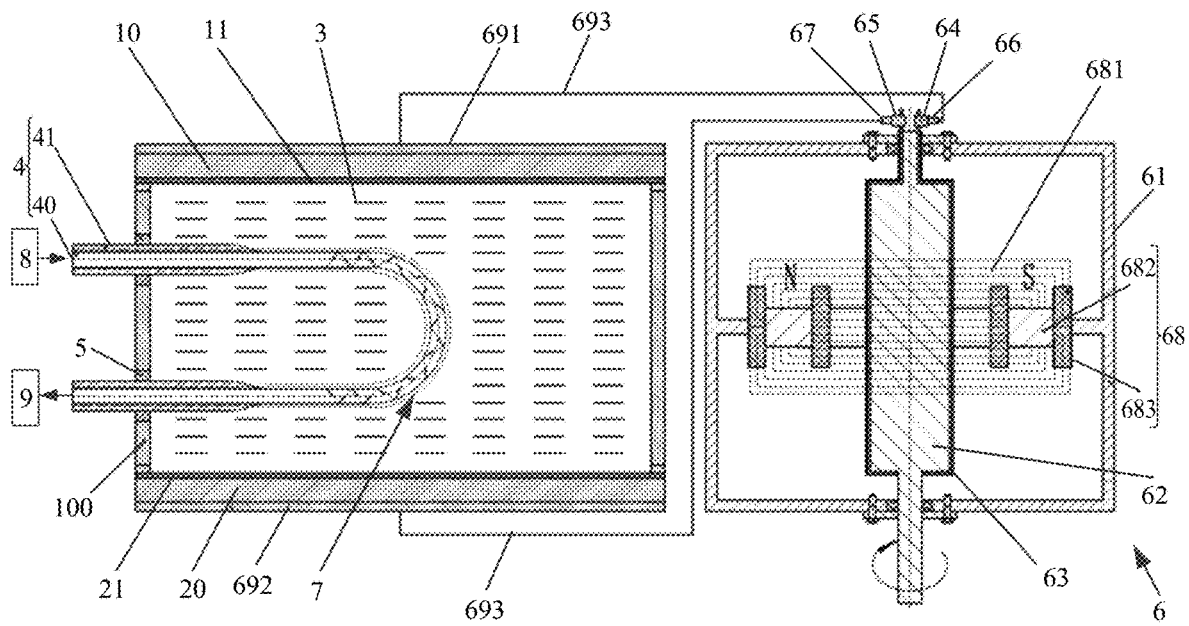
FIG. 2 is a schematic cross-sectional view of a rotational speed sensor according to some embodiments of the present disclosure.

Based on the above analysis, as shown in FIG. 2, some embodiments of the present disclosure provide a rotational speed sensor, including a liquid crystal cell, a rotational speed sensing module, and a rotational speed determining module. The rotational speed sensing module is used to convert a rotational speed into a voltage signal and then apply it to the liquid crystal cell. The liquid crystal molecules 3 in the liquid crystal cell are deflected under effect of the voltage signal. The rotational speed is a rotational speed of an object whose rotational speed is to be measured (also referred to as an object to be measured). The rotational speed sensing module is connected to the liquid crystal cell and the object to be measured.

The rotational speed determining module includes an optical signal propagation module (such as the single-mode plastic optical fiber 4 in FIG. 2), an optical signal transmitting module 8, and an optical signal receiving module 9. At least a part of the optical signal propagation module is located in the liquid crystal cell, the optical signal is totally reflected when propagated in the optical signal propagation module, and a drift time of a spectrum corresponding to the optical signal propagated in the optical signal propagation module is variable as a refractive index of the liquid crystal molecules 3 in the liquid crystal cell changes. The optical signal transmitting module 8 is configured to transmit an optical signal to the optical signal propagation module. The optical signal receiving module 9 is configured to receive the optical signal propagated by the optical signal propagation module and analyze the spectrum thereof to determine the rotational speed of the object to be measured. The optical signal transmitting module 8 is located at an optical signal input end of the optical signal propagation module, and the optical signal receiving module 9 is located at an optical signal output end of the optical signal propagation module.

Specifically, the liquid crystal molecules 3 in the liquid crystal cell are fluid having orientation order, which has both of liquid flowability and crystal birefringence. The liquid crystal molecules 3 in the liquid crystal cell may be, for example, nematic liquid crystal molecules, the nematic liquid crystal molecules have a long rod shape, the molecules are axially ordered, and are sensitive to external conditions, and the nematic liquid crystal molecules are generally maintained in a certain orientation with a method such as a polyimide film (PI) rubbing method, an electro-optic effect, etc., where the PI rubbing method includes: depositing a PI film on the surface of the glass substrate by spin coating or letterpress printing, and then using a flannel to rub the PI film in one direction to form a groove structure in a certain direction. When the glass substrate is applied to the liquid crystal cell, the arrangement direction of the long axis of the liquid crystal molecules is parallel to the rubbing direction, and the surface mooring effect is achieved. The principle of electro-optic effect includes: under the action of electric field, the dipole will be oriented in the direction of the electric field, which causes the original arrangement of liquid crystal molecules 3 to change, and the optical properties of liquid crystal molecules 3 also change. The change in the optical properties of the liquid crystal molecules 3 caused by the external electric field is referred to as the electro-optic effect of the liquid crystal.

The optical signal propagation module may include one medium or two media. Illustratively, when the optical signal propagation module includes one medium, it is set that the optical signal propagation module is completely covered by the liquid crystal layer, and the refractive index of the optical signal propagation module is greater than the refractive index of the liquid crystal layer; when the optical signal propagation module comprises two kinds of media, it may be set that the first medium dads a part of the second medium, another part of the second medium which is not cladded is directly in contact with the liquid crystal layer, and the refractive index of the second medium is greater than the refractive index of the first medium and the refractive index of the liquid crystal layer; in this way, when the optical signal is propagated in the optical signal propagation module, total reflection can occur, and the penetration depth $d_p$ of the generated evanescent wave 70 is related to the refractive index of the liquid crystal molecules 3 in the liquid crystal layer.

It should be noted that, since the refractive index of the liquid crystal molecules 3 changes correspondingly when the liquid crystal molecules 3 are deflected, in order to ensure that total reflection can occur when the optical signal is propagated in the optical signal propagation module regardless of the change in the refractive index of the liquid crystal molecules 3: when the optical signal propagation module includes one medium, it may be set that the refractive index of the optical signal propagation module is greater than $n_{max}$, where $n_{max}$ represents the maximum refractive index of the liquid crystal molecule 3 during deflection, and when the optical signal propagation module includes two media, it may be set that the second medium has a refractive index greater than $n_{max}$. In actual application of the rotational speed sensor, the rotational speed sensing module is connected with the object to be measured, the object to be measured is rotated at a certain rotational speed, and the rotational speed sensing module converts the rotational speed of the object to be measured into a voltage signal and then applies it to the liquid crystal cell. The liquid crystal molecule 3 in the liquid crystal cell are deflected by the voltage signal, thereby changing the refractive index of the liquid crystal molecule 3. The optical signal transmitting module 8 emits an optical signal to the optical signal input end of the optical signal propagation module, the optical signal is totally reflected when propagated in the optical signal propagation module, and an evanescent wave 70 is generated at the interface of total reflection (such as evanescent wave generation region 7 in FIG. 2). As the refractive index of the liquid crystal molecule 3 changes, the penetration depth $d_p$ of the evanescent wave 70 changes, thereby affecting the time for which the energy of the evanescent wave 70 returns to the optical signal propagation module, and as a result, spectrum of the evanescent wave 70 drifts and eventually a change in the spectrum of the propagated optical signal is caused. After the optical signal is propagated by the optical signal propagation module, it is finally outputted from the optical signal output end of the optical signal propagation module to the optical signal receiving module 9, and the optical signal receiving module 9 performs spectrum analysis on the received optical signal to analyze time need by drift of the transmission peak or the loss peak of the spectrum so as to obtain change of the refractive index of the liquid crystal molecule 3 and then obtain the rotational speed of the object to be measured.

It should be noted that, when the object to be measured rotates at a certain rotational speed, the rotational speed sensing module can convert the rotational speed into a periodically varying voltage signal, and the arrangement of the liquid crystal molecules 3 in the liquid crystal cell changes periodically under the action of the voltage signal. As a result, the refractive index of the liquid crystal molecule 3 changes periodically. It can be obtained by the above formula (1) that, the penetration distance $d_p$ of the generated evanescent wave 70 will also periodically change, thereby causing the transmission peak and the loss peak of the evanescent wave 70 to periodically drift. After the optical signal receiving module 9 receives the optical signal, the spectrum of the optical signal can be analyzed to obtain the time required for the transmission peak or the loss peak of the evanescent wave 70 to periodically drift, thereby obtaining change of the refractive index of the liquid crystal molecule 3 and the rotational speed of the object to be measured.

It should be noted that, when measuring the rotational speed, multiple corresponding drift times can be measured at various rotational speeds, and a correspondence between rotational speed and drift time is obtained according to the multiple sets of data, so that after the drift time is obtained, the rotational speed of the object to be measured can be quickly obtained based on the correspondence.

According to the specific structure and application mode of the above-mentioned rotational speed sensor, in the rotational speed sensor provided by the embodiments of the present disclosure, at least a part of the optical signal propagation module is disposed in the liquid crystal cell, such that when the optical signal is propagated in the optical signal propagation module, the spectrum thereof can be affected by the refractive index of the liquid crystal molecules 3 in the liquid crystal cell. In addition, the rotational speed sensing module is connected with the object to be measured and the liquid crystal cell, the rotational speed of the object to be measured is converted into a voltage signal by the rotational speed sensing module, and then the voltage signal is applied to the liquid crystal cell. In this way, the liquid crystal molecules 3 in the liquid crystal cell can be deflected under the control of the voltage signal to change the refractive index of the liquid crystal molecules 3. It can be seen that in the rotational speed sensor provided by the embodiments of the present disclosure, the spectrum of the optical signal propagated in the optical signal propagation module is made to be related to the rotational speed of the object to be measured, so the rotational speed of the object to be measured can be obtained by analyzing the spectrum of the optical signal propagated by the signal propagation module.

It can be seen that when the rotational speed sensor provided by the embodiments of the present disclosure is used for determining the rotational speed, relation between the rotational speed and the spectrum is established, and the rotational speed of the object to be measured can be obtained by analyzing the spectrum, which is not easily interfered by the external environment, and has a superior signal to noise ratio and frequency response. In addition, the rotational speed sensor provided by the embodiments of the present disclosure has the advantages of simple principle, small size, low production cost, and the like.

In addition, in the rotational speed sensor provided by the embodiments of the present disclosure, deflection of the liquid crystal molecule 3 is controlled to change the refractive index of the liquid crystal molecule 3, thereby changing the spectrum of the optical signal propagated in the optical signal propagation module. Since the liquid crystal molecules 3 do not absorb the evanescent wave 70 generated during propagation of the optical signal in the signal propagation module, the rotational speed sensor provided by the embodiments of the present disclosure can not only accurately reflect the rotation of the object to be measured, but also has stable operation performance.

It should be noted that the above-mentioned optical signal transmitting module 8 may include a regulated power source, and a light source capable of emitting broadband light having a wavelength range of, for example, 500 nanometers (nm) to 1700 nm, as an incident light signal under the control of the regulated power source. In some embodiments, broadband light having a wavelength range of 1300 nm to 1680 nm is selected as the incident optical signal, which is more advantageous for improving the sensitivity of the rotational speed sensor.

In some embodiments, the optical signal input end and the optical signal output end of the optical signal propagation module may be disposed outside the liquid crystal cell, and the optical signal propagation portion between the optical signal input end and the optical signal output end of the optical signal propagation module is located in the liquid crystal cell.

Specifically, the optical signal input end and the optical signal output end of the optical signal propagation module can be disposed outside the liquid crystal cell, the optical signal input end can receive the optical signal emitted by the optical signal transmitting module 8, and the optical signal output end can output the optical signal propagated by the optical signal propagation module to the optical signal receiving module 9; the optical signal propagation portion between the optical signal input end and the optical signal output end of the optical signal propagation module is located inside the liquid crystal cell, so that the spectrum of the optical signal can be affected by the refractive index of the liquid crystal molecules 3 in the liquid crystal cell when the optical signal is propagated in the optical signal propagation module.

With the above arrangement manner, the optical signal transmitting module 8, the optical signal receiving module 9, and the optical signal input end and the optical signal output end of the optical signal propagation module are disposed outside the liquid crystal cell, thereby avoiding influence on deflection of the liquid crystal molecules 3 in the liquid crystal cell caused by these structures. In addition, the optical signal propagation portion in the optical signal propagation module is disposed inside the liquid crystal cell, so that the spectrum of the optical signal propagated in the optical signal propagation portion is related to the refractive index of the liquid crystal molecule 3. In this way, by analyzing the spectrum of the optical signal propagated by the optical signal propagation module, change of the refractive index of the liquid crystal molecule 3 is obtained, thereby obtaining the rotational speed of the object to be measured.

In some embodiments, the optical signal propagation module provided by the above embodiments has various structures. Illustratively, the optical signal propagation module includes a single-mode optical fiber, such as a single-mode plastic optical fiber 4, the core 40 of at least a part of the single-mode plastic optical fiber 4 is exposed, and the core 40 of the remaining part of the single-mode plastic optical fiber 4 is covered by the cladding 41.

Specifically, the optical signal propagation module is arranged to include the single-mode plastic optical fiber 4 to enable that total reflection can occur when the optical signal is propagated in the single-mode plastic optical fiber 4. In addition, the core 40 of at least a part of the single-mode plastic optical fiber 4 located inside the liquid crystal cell is exposed, and the refractive index of the core 40 is set to be larger than the refractive index of the liquid crystal layer, so that when the optical signal is propagated in a portion of the exposed core 40, total reflection can occur, and the spectrum of the optical signal is related to the refractive index of the liquid crystal layer. Correspondingly, by analyzing the spectrum of the optical signal propagated by the optical signal propagation module, the refractive index change of the liquid crystal layer can be obtained, thereby obtaining the rotational speed of the object to be measured. In addition, the core 40 of at least a part of the single-mode plastic optical fiber 4 inside the liquid crystal cell is exposed, and the core of the at least a part contacts the liquid crystal molecules 3, effectively reducing the refractive index difference between the core 40 and the liquid crystal molecules 3. As a result, the penetration depth $d_p$ is increased, so that the rotational speed sensor has higher sensitivity.

In some embodiments, as shown in FIG. 2, the single-mode plastic optical fiber 4 may be a U-shaped single-mode plastic optical fiber 4, and the core 40 of a curved portion of the U-shaped single-mode plastic optical fiber 4 is exposed.

Specifically, according to the above formula (1), the penetration depth $d_p$ of the evanescent wave 70 is related to the incident angle corresponding to the optical signal, that is, the penetration depth $d_p$ of the evanescent wave 70 increases as the incident angle corresponding to the optical signal decreases. Therefore, by arranging the single-mode plastic optical fiber 4 as the U-shaped single-mode plastic optical fiber 4 and exposing the core 40 in the curved portion of the U-shaped single-mode plastic optical fiber 4, the incident angle of the optical signal generated at the curved portion of the U-shaped single-mode plastic optical fiber 4 can be effectively reduced, which increases the range of the evanescent wave 70, and improves the sensitivity of the rotational speed sensor.

In some embodiments, the optical signal receiving module 9 provided by the foregoing embodiments may include:

a photoelectric converting module, configured to receive the optical signal propagated by the optical signal propagation module and convert the optical signal into an electrical signal;

a signal processing module, connected to the photoelectric converting module and configured to process the electrical signal; and a spectrum analyzing module, connected to the signal processing module and configured to perform spectrum analysis on the processed electrical signal to determine the rotational speed of the object to be measured.

Specifically, after the optical signal is propagated by the optical signal propagation module, it is outputted from the optical signal output end of the optical signal propagation module to the photoelectric converting module, the photoelectric converting module converts the received optical signal into an analog electrical signal, and then transmits it to the signal processing module, the signal processing module performs signal amplification, address decoding, analog-to-digital conversion and filtering on the received electrical signal, and then continues to transmit it to the spectrum analyzing module, and the spectrum analyzing module performs spectrum analysis on the received electrical signal to determine the rotational speed of the object to be measured.

It should be noted that, the above photoelectric converting module may be, for example, a charge coupled device (CCD for short). The signal processing module may include a signal amplifying circuit, an address decoder, an analog to digital converter, a filter, and the like. The spectrum analyzing module may be, for example, a spectrometer.

The specific structures of the liquid crystal cell and the rotational speed sensing module provided by the above embodiments may be various. As shown in FIG. 2, in some embodiments, the liquid crystal cell may include: a first substrate 10 and a second substrate 20 opposite to each other; a sidewall 100 of the liquid crystal cell between the first substrate 10 and the second substrate 20, where the sidewall 100 of the liquid crystal cell defines a receiving space of the liquid crystal cell; a first alignment layer 11 on a surface of the first substrate 10 facing the second substrate 20; and a second alignment layer 21 on a surface of the second substrate 20 facing the first substrate 10, where the liquid crystal molecules 3 are between the first alignment layer 11 and the second alignment layer 21.

In some embodiments, the rotational speed sensing module may include: a first electrode plate 691 on a side of the first substrate 10 facing away from the second substrate 20; and a second electrode plate 692 on a side on the second substrate 20 facing away from the first substrate 10; and a conversion device 6 connected to the first electrode plate 691, the second electrode plate 692, and the object to be measured, where the conversion device 6 converts the rotational speed of the object to be measured into the voltage signal and apply the voltage signal to the first electrode plate 691 and the second electrode plate 692.

Figure 3:
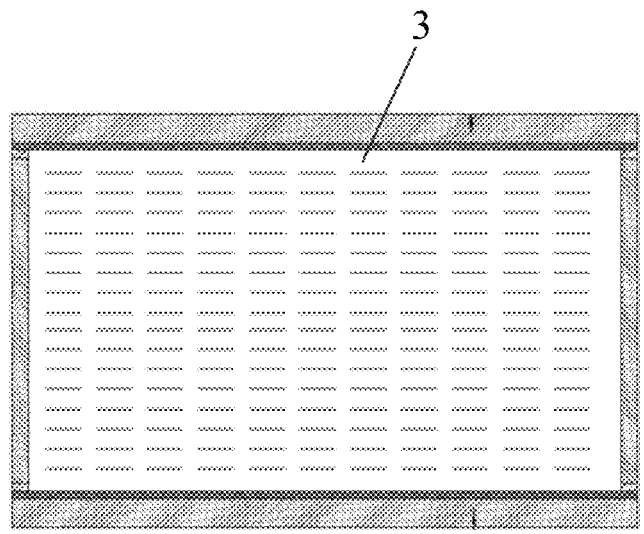
FIG. 3 is a schematic diagram showing distribution of liquid crystal molecules when a voltage signal is applied to a liquid crystal cell according to some embodiments of the present disclosure.

Specifically, when the liquid crystal cell of the above structure is employed, the liquid crystal molecules 3 in the liquid crystal cell may be aligned in the alignment manner of the first alignment layer 11 and the second alignment layer 21. In more detail, since the nematic liquid crystal molecules have a tendency to be aligned in the direction of lowest Gibbs free energy, the long-axis direction of the liquid crystal molecules 3 will be parallel to the groove direction of the alignment layer. Illustratively, as shown in FIG. 3, when no voltage signal is applied to the liquid crystal cell, the liquid crystal molecules 3 are only subjected to the groove anchoring force of the first alignment layer 11 and the second alignment layer 21, and have a regular arrangement in which the direction of the long axis is parallel to the direction of the grooves.

Figure 4:
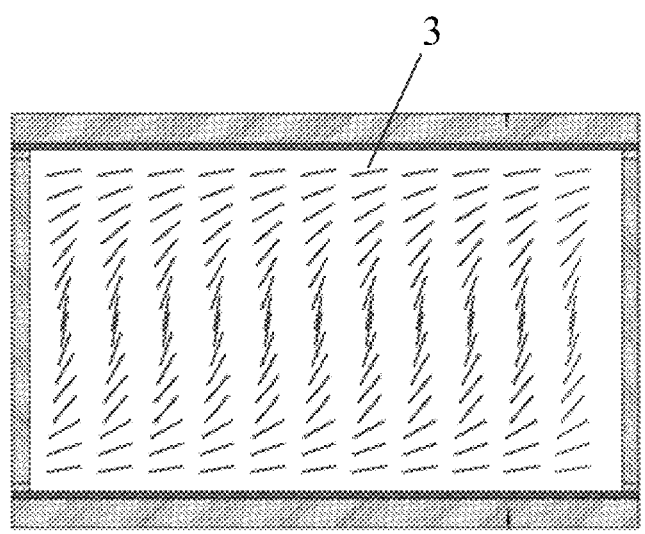
FIG. 4 is a schematic diagram showing distribution of liquid crystal molecules when no voltage signal is applied to a liquid crystal cell according to some embodiments of the present disclosure.

When the rotational speed sensing module with the above structure is employed, the conversion device may convert the rotational speed of the object to be measured into the voltage signal and apply it on the first electrode plate 691 and the second electrode plate 692, such that an electric field is generated between the first electrode plate 691 and the second electrode plate 692. Since the object to be measured keeps rotating, the generated voltage signal is a periodic voltage signal, so that a periodically varying electric field may be generated between the first electrode plate 691 and the second electrode plate 692. Based on the electro-optical effect of the liquid crystal molecules 3, the alignment orientation of the liquid crystal molecules 3 in the liquid crystal cell changes correspondingly with the change of the electric field. The liquid crystal molecules 3 are also subjected to anchoring force of each of the first alignment layer 11 and the second alignment layer 21, and the anchoring force decrease as a distance between the liquid crystal molecules 3 and the alignment layer increases. Therefore, the liquid crystal molecules 3 have an alignment orientation as follows: the molecules on the upper and lower sides have a smaller rotation angle and the molecules on the middle side have a larger rotation angle, as shown in FIG. 4. Further, since the refractive index of the liquid crystal molecules 3 is related to the orientation, the refractive index of the liquid crystal molecules 3 may also change correspondingly with the change of the electric field, thereby causing the spectrum of the optical signal propagated in the optical signal propagation module to change.

In some embodiments, when the optical signal input end and the optical signal output end of the optical signal propagation module are disposed outside the liquid crystal cell, and the optical signal propagation portion of the optical signal propagation module is disposed inside the liquid crystal cell. The specific arrangement between the optical signal propagation module and the liquid crystal cell is various. As shown in FIG. 2, illustratively, two mounting holes are disposed on the sidewall 100 of the liquid crystal cell, the optical signal input end and the optical signal output end of the optical signal propagation module protrude to the outside of the sidewall 100 of the liquid crystal cell through the two mounting holes respectively, and fixing glue 5 for fixing the optical signal propagation module is disposed in each of the two mounting holes.

Specifically, the optical signal propagation module may be placed inside the liquid crystal cell, and the optical signal input end and the optical signal output end of the optical signal propagation module are extended from the two mounting holes on the sidewall 100 of the liquid crystal cell to the outside of the liquid crystal cell. Then, the two mounting holes are filled with the fixing glue to fix the optical signal propagation module to the sidewall 100 of the liquid crystal cell. It should be noted that the above fixing glue 5 may be a photosensitive adhesive, but is not limited thereto.

It should be noted that the specific arrangement positions of the two mounting holes may be determined according to actual needs. Illustratively, the two mounting holes may be disposed at an intermediate portion of the sidewall 100 of the liquid crystal cell, that is, a distance between the two mounting holes and the first substrate 10 is equal to a distance between the two mounting holes and the second substrate 20, but the arrangement is not limited thereto.

It should be noted that when the rotational speed sensor provided in the above embodiments is used for rotational speed measurement, since the liquid crystal molecules 3 in the liquid crystal cell are simultaneously subjected to action of the alignment layers and the electric field, the liquid crystal molecules 3 close to the alignment layer have a deflection angle different from that of the liquid crystal molecules 3 away from the alignment layer at the same time. Correspondingly, the liquid crystal molecules 3 close to the alignment layer have a refractive index different from that of the liquid crystal molecules 3 away from the alignment layer. Therefore, for a case where the mounting holes are disposed at a position close to the alignment layer and a case where the mounting holes are disposed at a position away from the alignment layer, the deflection situations of the liquid crystal molecules 3 contacted by the optical signal propagation module are different. As a result, the above factors should be taken into consideration when actually assembling the optical signal propagation module and the liquid crystal cell, and selecting the material of the optical signal propagation module.

In some embodiments, as shown in FIG. 2, the conversion device 6 provided by the above embodiments may include: a rotating shaft 62 for connect the object to be measured; a magnet unit 68 for generating a magnetic field; and a toroidal coil 63 disposed on the rotating shaft, where the toroidal coil is synchronously rotatable with the rotating shaft, and the toroidal coil cuts magnetic lines of force 681 in the magnetic field when rotating with the rotating shaft. The conversion device 6 may further include a housing 61, a first slip ring 64, a second slip ring 65, a first brush 66, and a second brush 67. The rotating shaft 62 includes a first end, a second end, and a rotating shaft body therebetween, where the first end and the second end respectively protrude from the housing 61 and are respectively rotatably connected with the housing 61, the first end is further configured to connect the object to be measured, and the rotating shaft body is located inside the housing 61. A rotor of the first slip ring 64 is coupled to an end of the toroidal coil 63; a rotor of the second slip ring 65 is coupled to the other end of the toroidal coil 63; the first brush 66 is connected to a stator of the first slip ring 64 and the first electrode plate 691, the second brush 67 is connected to a stator of the second slip ring 65 and the second electrode plate 692. The magnet unit 68 is disposed on the inner wall of the housing 61.

Specifically, the conversion device 6 with the above structure operates in a manner as follow: the object to be measured drives the rotating shaft 62 to rotate periodically in a synchronous manner; the rotating shaft 62 drives the toroidal coil 63 to rotate periodically in a synchronous manner; the ring coil 63 periodically rotates to continuously cut the magnetic lines of force 681 generated by the magnet unit to generate an induced electromotive force, and an induced current of alternating current is formed on the toroidal coil 63, where the magnitude and direction of the induced current also change periodically; and the induced current flows through the first slip ring 64 and the first brush 66 and to the electrode plate 691, and flows through the second slip ring 65 and the second brush 67 and to the second electrode plate 692. In this case, the liquid crystal cell between the first electrode plate 691 and the second electrode plate 692 is equivalent to a capacitor, and thus the induced current propagated to the first electrode plate 691 and the second electrode plate 692 charges the liquid crystal cell, so that the electric field between the first substrate 10 and the second substrate 20 of the liquid crystal cell also changes periodically. According to the electro-optical effect of the liquid crystal molecules 3, the alignment orientation of the liquid crystal molecules 3 changes correspondingly with the change of the electric field, and therefore the liquid crystal molecules 3 are simultaneously subjected to the anchoring force of the alignment layers and the applied electric field. Since the refractive index of the liquid crystal molecule 3 is related to the orientation, the refractive index of the liquid crystal molecule 3 may vary correspondingly with the change of the electric field, thereby causing the spectrum of the optical signal propagated in the optical signal propagation module to change.

It should be noted that the rotating shaft 62 may be rotatably connected to the housing 61 through a rolling bearing; the rotor of the first slip ring 64 may be connected to an end of the toroidal coil 63 through a flat key; the rotor of the second slip ring 65 may be connected to the other end of the toroidal coil 63 through a flat key; a groove may be provided on the rotating shaft, and the toroidal coil 63 may be disposed in the groove of the rotating shaft 62.

In some embodiments, the magnet unit 68 provided by the above embodiments includes: a U-shaped permanent magnet 682 and magnetic conductive blocks 683. The annular coil 63 is between two magnetic poles of the U-shaped permanent magnet 682; the magnetic conductive blocks 683 are adsorbed on the magnetic poles of the U-shaped permanent magnet 682, and the magnetic conductive blocks 683 extend in an axial direction of the rotating shaft.

It should be noted that the number of the magnetic conductive blocks 683 may be set according to actual needs. For example, the magnet unit 68 includes four magnetic conductive blocks 683, two of which are adsorbed on the N pole of the U-shaped permanent magnet 682, and the other two of which are adsorbed on the S pole of the U-shaped permanent magnet 682.

By arranging the magnet unit 68 with the above-described structure, the magnetic lines of force 681 generated by the magnet unit 68 can be linearly distributed, so that intensity distribution of the magnetic field is uniform. Moreover, by disposing the magnet unit 68 inside the housing 61, the generated magnetic field can be confined inside the housing 61, thereby preventing the generated magnetic field from affecting the outside and being affected by external magnetic field.

It should be further noted that the magnet unit 68 may be mounted on the inner wall of the housing 61 in various ways. Illustratively, a mounting member may be provided on the inner wall of the housing 61, and the magnet unit 68 may be mounted to the inner wall of the housing 61 by an interference fit.

Some embodiments of the present disclosure provide an electronic device including the rotational speed sensor provided by the above embodiments.

Since the rotational speed sensor provided by the above embodiments has the advantages of being less susceptible to interference from the external environment, stable performance, small size, low production cost, and the like, the electronic device provided by the embodiments of the present disclosure including the rotational speed sensor also has the above advantages, which are not repeated here.

Some embodiments of the present disclosure provide a method for manufacturing a rotational speed sensor, which is applied to manufacturing the rotational speed sensor provided by the above embodiments, and the method includes:

forming an optical signal propagation module;

forming a liquid crystal cell, and assembling the optical signal propagation module and the liquid crystal cell, such that at least a part of the optical signal propagation module is located in the liquid crystal cell; where an optical signal is totally reflected when propagated in the optical signal propagation module, and a drift time of a spectrum corresponding to the optical signal propagated in the optical signal propagation module is variable as a refractive index of liquid crystal molecules 3 in the liquid crystal cell changes;

forming a rotational speed sensing module, and connecting the rotational speed sensing module to the liquid crystal cell, where the rotational speed sensing module is configured to convert a rotational speed into a voltage signal and then apply it to the liquid crystal cell;

providing an optical signal transmitting module 8 at an optical signal input end of the optical signal propagation module, where the optical signal transmitting module 8 is configured to transmit the optical signal to the optical signal propagation module; and providing an optical signal receiving module 9 at an optical signal output end of the optical signal propagation module, where the optical signal receiving module 9 is configured to receive the optical signal propagated by the optical signal propagation module, and analyze the spectrum thereof to determine the rotational speed.

The rotational speed is a rotational speed of an object to be measured which is connected to the conversion device.

Specifically, the optical signal propagation module may be made with various materials according to actual needs, as long as total reflection can occur when the optical signal is propagated in the optical signal propagation module. The liquid crystal molecules in the liquid crystal cell are deflected by the voltage signal. In the manufacturing process of the liquid crystal cell, the optical signal propagation module is assembled with the liquid crystal cell, so that at least a part of the optical signal propagation module is placed in the liquid crystal cell, and the spectrum of the optical signal propagated in the optical signal propagation module can be variable as the refractive index of the liquid crystal molecules 3 changes.

In the rotational speed sensor manufactured by the method provided by the embodiments of the present disclosure, at least a part of the optical signal propagation module is disposed in the liquid crystal cell, in this way, when the optical signal is propagated in the optical signal propagation module, the spectrum of the optical signal can be effected by the refractive index of the liquid crystal molecules 3 in the liquid crystal cell. In addition, the rotational speed sensing module is connected with the object to be measured and the liquid crystal cell, the rotational speed of the object to be measured is converted into the voltage signal by the rotational speed sensing module, and the voltage signal is applied to the liquid crystal cell, in this way, the liquid crystal molecules 3 in the liquid crystal cell can be deflected under the control of the voltage signal to change the refractive index of the liquid crystal molecules 3. It can be seen that in the rotational speed sensor fabricated by the method provided by the embodiments of the present disclosure, the spectrum of the optical signal propagated in the optical signal propagation module is related to the rotational speed of the object to be measured, so that the rotational speed of the object to be measured may be obtained by analyzing the spectrum of the optical signal propagated through the signal propagation module.

It can be seen that when the rotational speed sensor manufactured by the method provided by the embodiments of the present disclosure is used for measuring rotational speed, a relation between the rotational speed and the spectrum are established, and the rotational speed of the object to be measured may be obtained by analyzing the spectrum, which is not easily susceptible to interference of the outside environment, and has a superior signal-to-noise ratio and frequency response. In addition, the rotational speed sensor manufactured by the method provided by the embodiments of the present disclosure has the advantages of simple principle, small size, low production cost, and the like.

In addition, in the rotational speed sensor manufactured by the manufacturing method provided by the embodiments of the present disclosure, deflection of the liquid crystal molecule 3 is controlled to change the refractive index of the liquid crystal molecule 3, thereby changing the spectrum of the optical signal propagated in the optical signal propagation module. Since the liquid crystal molecules 3 do not absorb the evanescent wave 70 generated when the optical signal is propagated in the optical signal propagation module, the rotational speed sensor provided by the embodiments of the present disclosure can not only accurately reflect rotation of the object to be measured, but also has stable operation performance.

In some embodiments, the step of forming the optical signal propagation module includes:

providing a single-mode plastic optical fiber 4, where the single-mode plastic optical fiber 4 includes a core 40 and a cladding 41 covering the core 40; and removing the cladding 41 of at least a part of the single-mode plastic optical fiber 4 located in the liquid crystal cell to expose the core 40.

Specifically, the single-mode plastic optical fiber 4 with a size that satisfies the requirements is provided, and at least a part of the single-mode plastic optical fiber 4 is placed in a hydrofluoric acid of 30% concentration, and the hydrofluoric acid is applied to corrode the cladding 41 of the single-mode plastic optical fiber 4 at room temperature. After the corrosion is completed, the corroded surface of the single-mode plastic optical fiber 4 may be washed with 99% absolute ethanol, and then the corroded surface is cleaned with clean water (the cleaning time may be, for example, 5 minutes). After, the single-mode plastic optical fiber 4 is placed in a dryer to be dried, thereby completing the removing of the cladding 41 of the single-mode plastic optical fiber 4.

It should be noted that, when the single-mode plastic optical fiber 4 is corroded, the single-mode plastic optical fiber 4 may be rotated along its axial direction to ensure corrosion uniformity of the single-mode plastic optical fiber 4 at different positions.

In some embodiments, the optical signal propagation module may be, for example, a U-shaped single-mode plastic optical fiber 4. In a case that the optical signal propagation module is a U-shaped single-mode plastic optical fiber 4, before removing the cladding 41 of the single-mode plastic optical fiber 4, the method provided by the above embodiments further includes: forming the single-mode plastic optical fiber 4 into a U-shaped single-mode plastic optical fiber 4; and the step of removing the cladding 41 of at least a part of the single-mode plastic optical fiber 4 in the liquid crystal cell includes:

removing the cladding 41 of a curved portion of the U-shaped single-mode plastic optical fiber 4.

Specifically, a single-mode plastic optical fiber 4 having a core 40 with a diameter of 200 μm can be selected, the single-mode plastic optical fiber 4 is placed in a U-shaped mold prepared in advance, and then the mold and the single-mode plastic optical fiber 4 placed therein are placed in a heating furnace of 450° C. In the high temperature environment, the single-mode plastic optical fiber 4 is softened to form a U-shaped single-mode plastic optical fiber 4, and then the heating furnace is controlled to stop heating, so that the formed U-shaped single-mode plastic optical fiber 4 cools with the furnace. Finally, the U-shaped single-mode plastic optical fiber 4 is taken out for surface smoothing, to complete the manufacturing of the U-shaped single-mode plastic optical fiber 4. It should be noted that the radius of the curved portion of the U-shaped single-mode plastic optical fiber 4 may be, for example, 2 millimeters (mm), but the size is not limited thereto.

When removing the cladding 41 of the curved portion of the U-shaped single-mode plastic optical fiber 4, the curved portion of the U-shaped single-mode plastic optical fiber 4 may be placed in a hydrofluoric acid of 30% concentration, and the hydrofluoric acid is applied to corrode the cladding 41 of the single-mode plastic optical fiber 4 at room temperature. After the corrosion is completed, the corroded surface of the single-mode plastic optical fiber 4 may be washed with 99% absolute ethanol, and then the corroded surface is cleaned with water. After, the cleaned single-mode plastic optical fiber 4 is placed in a dryer to be dried, thereby completing the removing of the cladding 41 of the curved portion of the single-mode plastic optical fiber 4.

In some embodiments, the steps of fabricating the liquid crystal cell and assembling the optical signal propagation module and the liquid crystal cell include:

providing a first substrate 10, and forming a first alignment layer 11 on the first substrate 10;

providing a second substrate 20, and forming a second alignment layer 21 on the second substrate 20;

providing a sidewall 100 of liquid crystal cell, where the liquid crystal cell sidewall 100 is provided with two mounting holes, and the sidewall 100 of the liquid crystal cell defines a receiving space of the liquid crystal cell;

providing the single-mode plastic optical fiber 4 inside the sidewall 100 of the liquid crystal cell, where an input end and an output end of the single-mode plastic optical fiber 4 respectively protrude out of the sidewall 100 of the liquid crystal cell through the two mounting holes, and a part of the single-mode plastic optical fiber 4 where the core 40 is exposed is located inside the sidewall 100 of the liquid crystal cell;

filling the two mounting holes with a fixing glue 5 for fixing the single-mode plastic optical fiber;

assembling the first substrate 10 and the sidewall of 100 the liquid crystal cell to form a receiving box, where the first alignment layer 11 of the first substrate 10 faces the single-mode plastic optical fiber;

dropping the liquid crystal molecules 3 into the receiving box; and assembling the second substrate 20 and the receiving box such that the second alignment layer 21 of the second substrate 20 faces the single-mode plastic optical fiber 4.

The input end and the output end of the single-mode plastic optical fiber 4 are the optical signal input end and the optical signal output end.

Specifically, the first substrate 10 and the second substrate 20 are provided, and then the two substrates are cleaned. The specific cleaning process is as follows: the two substrates are cleaned in an ultrasonic cleaner by using 99% absolute ethanol. The two substrates are placed in an oven after the cleaning is completed, and are baked at 200±20° C. for one hour. It should be noted that the diameters of the first substrate and the second substrate may be, for example, 8 mm, and the thicknesses of the first substrate and the second substrate may be, for example, 2 mm, and the materials of the two substrates may be Corning Gorilla Glass or other materials having high strength, corrosion resistance, and no reaction with liquid crystal.

After the cleaning of the two substrates is completed, an alignment layer is formed each of on the two substrates. Forming of a first alignment layer 11 on the first substrate 10 is taken as an example. The specific fabrication process is as follows: the first substrate 10 is placed on a rotary table in a vacuum chamber, a polyimide solution prepared in advance is dropped onto the first substrate 10 with a uniform rate by a spin coater, and the rotary table is rotated slowly at a speed of 2200 revolutions/minute (r/min) and then rotated rapidly at a speed of 5500 r/min. Thereby, a polyimide film is formed on the first substrate 10. Then, the first substrate 10 on which the polyimide film is formed is placed in an oven, and baked at 110±10° C. for one hour, then the temperature is gradually increased to 150° C., 180° C., 230° C., and the first substrate 10 is baked at each temperature for 45 minutes, to complete curing of the polyimide film.

After the polyimide film is cured, a fluffy cloth may be repeatedly rubbed in a certain direction on a surface of the polyimide film to form a groove in a certain direction on the surface of the polyimide film. After the rubbing is completed, cleaning operation is performed. Specifically, the first substrate 10 and the polyimide film may be cleaned with water for 5 minutes and then dried, to complete manufacturing of the first alignment layer 11.

For the process of manufacturing a second alignment layer 21 on the second substrate 20, reference can be made to the process of manufacturing the first alignment layer 11 on the first substrate 10, and details are not described herein.

A sidewall 100 of the liquid crystal cell is provided, two mounting holes are formed on the sidewall 100 of the liquid crystal cell, and the fabricated single-mode plastic optical fiber 4 is placed in a receiving space defined by the sidewall 100 of the liquid crystal cell. The single-mode plastic optical fiber 4 and the sidewall 100 of the liquid crystal cell are each placed on a fixture using a six-dimensional adjusting frame. The two mounting holes on the sidewall 100 of the liquid crystal cell are found under the microscope, and the microscope image is adjusted until the inner hole can be clearly seen. The single-mode plastic optical fiber 4 is slowly brought close to the mounting holes on the sidewall 100 of the liquid crystal cell by moving the single-mode plastic optical fiber 4 in a left-right direction, and the optical signal input end and the optical signal output end are protruded from the two mounting holes to the outside of the sidewall 100 of the liquid crystal cell at a uniform speed. Then, photosensitive adhesive is coated to the mounting holes on the sidewall under the microscope, and the photosensitive adhesive is irradiated with ultraviolet light until it is sufficiently cured, to complete fixing of the optical signal propagation module to the sidewall 100 of the liquid crystal cell.

It should be noted that material of the sidewall 100 of the liquid crystal cell may be selected as Corning Gorilla Glass, a thickness thereof may be set as 3 mm, a height of the liquid crystal cell in a direction perpendicular to the first substrate 10 and the second substrate 20 may be controlled to be 10 mm, and it is ensured that the formed liquid crystal cell is transparent. Further, a length of the part of the single-mode plastic optical fiber 4 left in the liquid crystal cell in a direction perpendicular to the mounting holes may be set as 5 mm, which is not limited thereto.

After the optical signal propagation module is fixed on the sidewall 100 of the liquid crystal cell, the assembly of the liquid crystal cell is performed. The specific assembly process is as follows: photosensitive adhesive is coated on a side of the first substrate 10 on which the first alignment film 11 is formed, the six-dimensional adjusting frame is used to fix the sidewall of the liquid crystal cell and the first substrate 10 coated with the photosensitive adhesive, the first substrate 10 is bonded to the sidewall 100 of the liquid crystal cell via the photosensitive adhesive under the microscope, and ultraviolet light to is used to cure photosensitive adhesive, so that the first substrate 10 is fixedly connected to the sidewall 100 of the liquid crystal cell to form a receiving box. A micro burette is used to drop the liquid crystal molecules 3 into the receiving box under a microscope, where the liquid crystal molecules 3 in the receiving box are arranged along the groove direction of the alignment film; then, photosensitive adhesive is coated on a side of the second substrate 20 on which the second alignment film 21 is formed, the six-dimensional adjusting frame is used to fix the sidewall 100 of the liquid crystal cell and the second substrate 20 coated with the photosensitive adhesive, the second substrate 20 is bonded to the sidewall 100 of the liquid crystal cell via the photosensitive adhesive under the microscope, and ultraviolet light to is used to cure photosensitive adhesive, so that the second substrate 20 is fixedly connected to the sidewall 100 of the liquid crystal cell, to complete manufacturing of the liquid crystal cell and assembling of the optical signal propagation module and the liquid crystal cell.

In some embodiments, the step of forming the rotational speed sensing module and connecting the rotational speed sensing module to the liquid crystal cell in the above embodiments includes:

forming a conversion device 6;

forming a first electrode plate 691 on a surface of the first substrate 10 facing away from the second substrate 20;

forming a second electrode plate 692 on a surface of the second substrate 20 facing away from the first substrate 10; and connecting the conversion device 6 to the first electrode plate 691 and the second electrode plate 692, where the conversion device 6 is used to convert the rotational speed into the voltage signal and then apply the voltage signal to the first electrode plate 691 and the second electrode plate 692. The rotational speed is a rotational speed of the object to be measured connected to the conversion device.

Specifically, the first electrode plate 691 and the second electrode plate 692 each may be, for example, a conductive copper foil tape, and the conductive copper foil tape may be directly attached to the first substrate 10 and the second substrate 20 as corresponding first electrode plate 691 and second electrode plate 692. In some embodiments, the conversion device 6 may be connected to the first electrode plate 691 and the second electrode plate 692 via corresponding copper wires 693, and connected to the object to be measured via the rotating shaft 62 in the conversion device 6.

When the rotational speed sensing module with the above structure is in operation, the conversion device 6 may convert the rotational speed of the object to be measured into the voltage signal and apply it on the first electrode plate 691 and the second electrode plate 692, such that an electric field is generated between the first electrode plate 691 and the second electrode plate 692. Since the object to be measured keeps rotating, the generated voltage signal is a periodic voltage signal, so that a periodically varying electric field may be generated between the first electrode plate 691 and the second electrode plate 692. Based on the electro-optical effect of the liquid crystal molecules 3, the alignment orientation of the liquid crystal molecules 3 in the liquid crystal cell changes correspondingly with the change of the electric field. The liquid crystal molecules 3 are also subjected to anchoring force of each of the first alignment layer 11 and the second alignment layer 21, and the anchoring force decrease as a distance between the liquid crystal molecule 3 and the alignment layer increases. Therefore, the liquid crystal molecules 3 have an alignment orientation as follows: the molecules on the upper and lower sides have a smaller rotation angle and the molecules on the middle side have a larger rotation angle, as shown in FIG. 4. Further, since the refractive index of the liquid crystal molecules 3 is related to the orientation, the refractive index of the liquid crystal molecules 3 may also change correspondingly with the change of the electric field, thereby causing the spectrum of the optical signal propagated in the optical signal propagation module to change.

Some embodiments of the present disclosure further provide a driving method of a rotational speed sensor, which is applied to the rotational speed sensor provided by the above embodiments, and the method includes:

converting, by the rotational speed sensing module, a rotational speed into a voltage signal, and applying the voltage signal to the liquid crystal cell;

transmitting, by the optical signal transmitting module 8, an optical signal to the optical signal propagation module, where the optical signal is totally reflected when propagated in the optical signal propagation module, and a drift time of a spectrum corresponding to the optical signal is variable as the refractive index of the liquid crystal molecules 3 in the liquid crystal cell changes; and receiving, by the optical signal receiving module 9, the optical signal propagated by the optical signal propagation module, and analyzing the spectrum of the optical signal as received to determine the rotational speed.

When the above rotational speed sensor is driven by the method according to the embodiments of the present disclosure, the rotational speed sensing module is connected with the object to be measured, the object to be measured is rotated at a certain rotational speed, and the rotational speed sensing module converts the rotational speed of the object to be measured into a voltage signal and then applies it to the liquid crystal cell. The liquid crystal molecule 3 in the liquid crystal cell are deflected by the voltage signal, thereby changing the refractive index of the liquid crystal molecule 3. The optical signal transmitting module 8 emits an optical signal to the optical signal input end of the optical signal propagation module, the optical signal is totally reflected when propagated in the optical signal propagation module, and an evanescent wave 70 is generated at the interface of total reflection (such as evanescent wave generation region 7 in FIG. 2). As the refractive index of the liquid crystal molecule 3 changes, the penetration depth $d_p$ of the evanescent wave 70 changes, thereby affecting the time for which the energy of the evanescent wave 70 returns to the optical signal propagation module, and as a result, spectrum of the evanescent wave 70 drifts and eventually a change in the spectrum of the propagated optical signal is caused. After the optical signal is propagated by the optical signal propagation module, it is finally outputted from the optical signal output end of the optical signal propagation module to the optical signal receiving module 9, and the optical signal receiving module 9 performs spectrum analysis on the received optical signal to analyze time need by drift of the transmission peak or the loss peak of the spectrum so as to obtain change of the refractive index of the liquid crystal molecule 3 and then obtain the rotational speed of the object to be measured.

It should be noted that, when the object to be measured rotates at a certain rotational speed, the rotational speed sensing module may convert the rotational speed into a periodically varying voltage signal, and the arrangement of the liquid crystal molecules 3 in the liquid crystal cell changes periodically under the action of the voltage signal. As a result, the refractive index of the liquid crystal molecule 3 changes periodically. It can be obtained by the above formula (1) that, the penetration distance $d_p$ of the generated evanescent wave 70 will also periodically change, thereby causing the transmission peak and the loss peak of the evanescent wave 70 to periodically drift. After the optical signal receiving module 9 receives the optical signal, the spectrum of the optical signal may be analyzed to obtain the time required for the transmission peak or the loss peak of the evanescent wave 70 to periodically drift, thereby obtaining change of the refractive index of the liquid crystal molecule 3 and the rotational speed of the object to be measured. It should be noted that, when measuring the rotational speed, multiple corresponding drift times can be measured at various rotational speeds, and a correspondence between rotational speed and drift time is obtained according to the multiple sets of data, so that after the drift time is obtained, the rotational speed of the object to be measured can be quickly obtained based on the correspondence.

Since at least a part of the optical signal propagation module of the rotational speed sensor provided in the above embodiments is disposed in the liquid crystal cell, the spectrum of the optical signal can be affected by the refractive index of the liquid crystal molecule 3 in the liquid crystal cell when the optical signal is propagated in the optical signal propagation module. In addition, since the refractive index of the liquid crystal molecule 3 is related to the rotational speed of the object to be measured, when the rotational speed sensor is driven by the method provided by the embodiments of the present disclosure, the rotational speed of the object to be measured can be obtained by analyzing the spectrum of the optical signal propagated by the signal propagation module, which is not easily interfered by the external environment, and has a superior signal-to-noise ratio and frequency response.

In some embodiments, when the liquid crystal cell includes a first substrate 10 and a second substrate 20, and the rotational speed sensing module includes a first electrode plate 691, a second electrode plate 692, and a conversion device 6, the converting, by the rotational speed sensing module, the rotational speed into the voltage signal and applying the voltage signal on the liquid crystal cell includes:

transmitting, by the conversion device 6, the voltage signal to the first electrode plate 691 and the second electrode plate 692, after converting the rotational speed into the voltage signal, so as to generate an electric field between the first electrode plate 691 and the second electrode plate 692. The liquid crystal molecules 3 in the liquid crystal cell are deflected under action of the electric field.

Specifically, when the liquid crystal cell includes the first substrate 10 and the second substrate 20, and the rotational speed sensing module includes the first electrode plate 691, the second electrode plate 692, and the conversion device 6, the liquid crystal molecules 3 in the liquid crystal cell may be arranged according to alignment manner of the first alignment layer 11 and the second alignment layer 21.

When the liquid crystal cell and the rotational speed sensing module adopt the above structures, the conversion device 6 may convert the rotational speed of the object to be measured into the voltage signal and apply it on the first electrode plate 691 and the second electrode plate 692, such that an electric field is generated between the first electrode plate 691 and the second electrode plate 692. Since the object to be measured keeps rotating, the generated voltage signal is a periodic voltage signal, so that a periodically varying electric field may be generated between the first electrode plate 691 and the second electrode plate 692. Based on the electro-optical effect of the liquid crystal molecules 3, the alignment orientation of the liquid crystal molecules 3 in the liquid crystal cell changes correspondingly with the change of the electric field. The liquid crystal molecules 3 are also subjected to anchoring force of each of the first alignment layer 11 and the second alignment layer 21, and the anchoring force decrease as a distance between the liquid crystal molecules 3 and the alignment layer increases. Therefore, the liquid crystal molecules 3 have an alignment orientation as follows: the molecules on the upper and lower sides have a smaller rotation angle and the molecules on the middle side have a larger rotation angle, as shown in FIG. 4. Further, since the refractive index of the liquid crystal molecules 3 is related to the orientation, the refractive index of the liquid crystal molecules 3 may also change correspondingly with the change of the electric field, thereby causing the spectrum of the optical signal propagated in the optical signal propagation module to change.

In some embodiments, when the optical signal receiving module 9 includes a photoelectric converting module, a signal processing module, and a spectrum analyzing module, the step in which the optical signal receiving module 9 receives the optical signal propagated by the optical signal propagation module, and analyzes the spectrum of the optical signal to determine the rotational speed of the object to be measured specifically includes:

receiving, by the photoelectric converting module, the optical signal propagated by the optical signal propagation module, and converting it into an electrical signal;

processing, by the signal processing module, the electrical signal; and performing spectrum analysis, by the spectrum analyzing module, on the processed electrical signal, to determine the rotational speed of the object to be measured.

Specifically, after the optical signal is propagated by the optical signal propagation module, it is outputted from the optical signal output end of the optical signal propagation module to the photoelectric converting module, the photoelectric converting module converts the received optical signal into an analog electrical signal, and then transmits it to the signal processing module, the signal processing module performs signal amplification, address decoding, analog-to-digital conversion and filtering on the received electrical signal, and then continues to transmit it to the spectrum analyzing module, and the spectrum analyzing module performs spectrum analysis on the received electrical signal to determine the rotational speed of the object to be measured.

In the embodiments of the present disclosure, the sequence numbers of the steps are not to limit the order of the steps. For those skilled in the art, changes to sequence of the steps made without any creative work also fall within the protection scope of the present disclosure.

Unless otherwise defined, technical terms or scientific terms used in the present disclosure shall have common meanings understood by those ordinary skilled in the art. Terms such as "first" and "second" in the present disclosure do not indicate any order, quantity or importance, and they are merely used to distinguish different modules. Terms such as "include" or "contain" indicate that an element or object before such terms covers an element, an object or the equivalent enumerated after such terms, and do not exclude other elements and objects. Terms such as "coupled" and "connected" are not used to limit physical or mechanical connection, they may be direct or indirect electrical connection. Terms such as "above", "below", "left" and "right" are merely to describe relative position relationships, and if an absolute position of a described object changes, relative positions with respect to the described object may change correspondingly.

It can be understood that, if an element such as a layer, a film, a region or a substrate is described to be on or below another element, the element may be directly on or below the other element, or there may be an intermediate element between the element and the other element.

Specific features, structures, materials and characteristics in descriptions of the above implementations may be combined properly in one or more embodiments or examples.

The above descriptions merely illustrate some embodiments of the present disclosure, and the protection scope of the present disclosure is not limited thereto. Various modifications and substitutions made by those skilled in the art without departing from the technical scope of the present disclosure shall fall within the protection scope of the present disclosure. Therefore, the protection scope of the present disclosure shall be consistent with the scope defined in the appended claims.

What is claimed is:

1. A rotational speed sensor, comprising a liquid crystal cell, a rotational speed sensing member, and a rotational speed determining member;
   wherein the rotational speed sensing member is configured to convert a rotational speed of an object to be measured into a voltage signal and apply the voltage signal on the liquid crystal cell;
   the liquid crystal cell comprises a first substrate and a second substrate opposite to each other;
   the rotational speed sensing member comprises:
   a first electrode plate and a second electrode plate on two sides of the liquid crystal cell; and
   a conversion device connected to the first electrode plate and the second electrode plate, wherein the conversion device is configured to connect the object to be measured, convert the rotational speed of the object to be measured into the voltage signal, and apply the voltage signal to the first electrode plate and the second electrode plate;
   the first electrode plate is on a side of the first substrate facing away from the second substrate; and
   the second electrode plate is on a side of the second substrate facing away from the first substrate; and
   the rotational speed determining member comprises:
   an optical signal propagation member, wherein at least a part of the optical signal propagation member is located in the liquid crystal cell, an optical signal propagates in the optical signal propagation member through total internal reflection, and a drift time of a spectrum corresponding to the optical signal propagated in the optical signal propagation member is variable as a refractive index of liquid crystal molecules in the liquid crystal cell changes;
   an optical signal transmitting member, configured to transmit the optical signal to the optical signal propagation member; and
   an optical signal receiving member, configured to receive the optical signal propagated in the optical signal propagation member and analyze the spectrum of the optical signal as received to determine the rotational speed of the object to be measured.

2. The rotational speed sensor according to claim 1, wherein the optical signal transmitting member is located at an optical signal input end of the optical signal propagation member, the optical signal receiving member is located at an optical signal output end of the optical signal propagation member, the optical signal input end and the optical signal output end of the optical signal propagation member are located outside the liquid crystal cell, and an optical signal propagation portion between the optical signal input end and the optical signal output end of the optical signal propagation member is located inside the liquid crystal cell.

3. The rotational speed sensor according to claim 2, wherein the optical signal propagation member comprises a single-mode optical fiber, a core of at least a part of the single-mode optical fiber located inside the liquid crystal cell is exposed, and a core of the other part of the single-mode optical fiber is covered by a cladding.

4. The rotational speed sensor according to claim 3, wherein the single-mode optical fiber is a U-shaped single-mode plastic optical fiber, and a core of a curved portion of the U-shaped single-mode plastic optical fiber is exposed.

5. The rotational speed sensor according to claim 2, wherein,
   the liquid crystal cell comprises:
   a sidewall of the liquid crystal cell between the first substrate and the second substrate, wherein the sidewall of the liquid crystal cell defines a receiving space of the liquid crystal cell;
   a first alignment layer on a surface of the first substrate facing the second substrate; and
   a second alignment layer on a surface of the second substrate facing the first substrate, wherein the liquid crystal molecules are between the first alignment layer and the second alignment layer.

6. The rotational speed sensor according to claim 5, wherein two mounting holes are disposed on the sidewall of the liquid crystal cell, the optical signal input end and the optical signal output end of the optical signal propagation member protrude out of the sidewall of the liquid crystal cell through the two mounting holes respectively, and fixing glue for fixing the optical signal propagation member is provided in each of the two mounting holes.

7. The rotational speed sensor according to claim 1, wherein the optical signal receiving member comprises:
   a photoelectric converting member, configured to receive the optical signal propagated in the optical signal propagation member and convert the optical signal as received into an electrical signal;
   a signal processing member, configured to process the electrical signal; and a spectrum analyzing member, configured to perform spectrum analysis on the processed electrical signal to determine the rotational speed of the object to be measured.

8. The rotational speed sensor according to claim 1, wherein the conversion device comprises:
   a rotating shaft, configured to connect the object to be measured;
   a magnet unit, configured to generate a magnetic field; and
   a toroidal coil, disposed on the rotating shaft, wherein the toroidal coil is synchronously rotatable with the rotating shaft, and the toroidal coil cuts magnetic lines of force in the magnetic field when rotating with the rotating shaft.

9. The rotational speed sensor according to claim 8, wherein the conversion device comprises:
   a housing;
   a first slip ring, wherein a rotor of the first slip ring is connected to an end of the toroidal coil;
   a second slip ring, wherein a rotor of the second slip ring is connected to the other end of the toroidal coil;
   a first brush respectively connected to a stator of the first slip ring and the first electrode plate; and
   a second brush respectively connected to a stator of the second slip ring and the second electrode plate;
   the magnet unit is on an inner wall of the housing; and
   the rotating shaft comprises a first end, a second end and a rotating shaft body between the first end and the second end, the first end and the second end respectively protrude from the housing and are respectively rotatably connected to the housing, the first end is further configured to connect the object to be measured, and the rotating shaft body is located inside the housing.

10. The rotational speed sensor according to claim 9, wherein the magnet unit comprises:
    a U-shaped permanent magnet, wherein the toroidal coil is between two magnetic poles of the U-shaped permanent magnet; and
    magnetic conductive blocks adsorbed on the magnetic poles of the U-shaped permanent magnet, wherein the magnetic conductive blocks extend in an axial direction of the rotating shaft.

11. The rotational speed sensor according to claim 1, wherein the drift time of the spectrum corresponding to the optical signal propagated in the optical signal propagation member comprises a drift time of a transmission peak or a loss peak.

12. The rotational speed sensor according to claim 1, wherein the optical signal receiving member is configured to analyze the spectrum of the optical signal to obtain the drift time of the spectrum, and determine the rotational speed of the object to be measured based on a predetermined correspondence between rotational speed and drift time and the drift time.

13. An electronic device, comprising the rotational speed sensor according to claim 1.

14. A method of driving a rotational speed sensor, applied to the rotational speed sensor according to claim 1, comprising:
    converting, by the rotational speed sensing member, a rotational speed of an object to be measured into a voltage signal, and applying the voltage signal to the liquid crystal cell;
    transmitting, by the optical signal transmitting member, an optical signal to the optical signal propagation member, wherein the optical signal propagates in the optical signal propagation member through total internal reflection, and a drift time of a spectrum corresponding to the optical signal is variable as the refractive index of the liquid crystal molecules in the liquid crystal cell changes; and
    receiving, by the optical signal receiving member, the optical signal propagated in the optical signal propagation member, and analyzing the spectrum of the optical signal as received to determine the rotational speed of the object to be measured.

15. The method of driving the rotational speed sensor according to claim 14, wherein the converting, by the rotational speed sensing member, the rotational speed of the object to be measured into the voltage signal and applying the voltage signal on the liquid crystal cell comprises:
    transmitting, by the conversion device, the voltage signal to the first electrode plate and the second electrode plate, after converting the rotational speed of the object to be measured into the voltage signal, so as to generate an electric field between the first electrode plate and the second electrode plate.

16. A method of manufacturing a rotational speed sensor, comprising:
    forming an optical signal propagation member;
    forming a liquid crystal cell, and assembling the optical signal propagation member and the liquid crystal cell, such that at least a part of the optical signal propagation member is located in the liquid crystal cell, wherein an optical signal propagates in the optical signal propagation member through total internal reflection, and a drift time of a spectrum corresponding to the optical signal propagated in the optical signal propagation member is variable as a refractive index of liquid crystal molecules in the liquid crystal cell changes;
    wherein the forming the liquid crystal cell and assembling the optical signal propagation member module and the liquid crystal cell comprises providing a first substrate, and forming a first alignment layer on the first substrate
    forming a rotational speed sensing member, and connecting the rotational speed sensing member to the liquid crystal cell, wherein the rotational speed sensing member is configured to convert a rotational speed of an object to be measured into a voltage signal and apply the voltage signal on the liquid crystal cell;
    providing an optical signal transmitting member at an optical signal input end of the optical signal propagation member, wherein the optical signal transmitting member is configured to transmit the optical signal to the optical signal propagation member; and
    providing an optical signal receiving member at an optical signal output end of the optical signal propagation member, wherein the optical signal receiving member is configured to receive the optical signal propagated in the optical signal propagation member, and analyze the spectrum of the optical signal as received to determine the rotational speed of the object to be measured;
    wherein the forming the rotational speed sensing member and connecting the rotational speed sensing member to the liquid crystal cell comprises:
    forming a conversion device;
    forming a first electrode plate on a surface of the first substrate facing away from the second substrate;
    forming a second electrode plate on a surface of the second substrate facing away from the first substrate; and connecting the conversion device to the first electrode plate and the second electrode plate, wherein the conversion device is configured to convert the rotational speed of the object to be measured into the voltage signal and apply the voltage signal to the first electrode plate and the second electrode plate, and the object to be measured is connected to the conversion device.

17. The method of manufacturing the rotational speed sensor according to claim 16, wherein the forming the optical signal propagation member comprises:
   providing a single-mode optical fiber comprising a core and a cladding covering the core; and
   removing the cladding of at least a part of the single-mode optical fiber within the liquid crystal cell to expose the core.

18. The method of manufacturing the rotational speed sensor according to claim 17, wherein the single-mode optical fiber is a single-mode plastic optical fiber, and before removing the cladding of the single-mode optical fiber, the method further comprises:
   forming the single-mode plastic optical fiber into a U-shaped single-mode plastic optical fiber;
   the removing the cladding of the at least a part of the single-mode optical fiber within the liquid crystal cell comprises:
   removing the cladding of a curved portion of the U-shaped single-mode plastic optical fiber.

19. The method of manufacturing the rotational speed sensor according to claim 17, wherein the forming the liquid crystal cell and assembling the optical signal propagation member and the liquid crystal cell comprises:
   providing a second substrate, and forming a second alignment layer on the second substrate;
   providing a sidewall of the liquid crystal cell, wherein the sidewall of the liquid crystal cell is provided with two mounting holes, and the sidewall the liquid crystal cell defines a receiving space of the liquid crystal cell;
   placing the single-mode optical fiber inside the sidewall of the liquid crystal cell, wherein an input end and an output end of the single-mode optical fiber respectively protrude out of the sidewall of the liquid crystal cell through the two mounting holes, and a part of the single-mode optical fiber where the core is exposed is located inside the sidewall of the liquid crystal cell;
   filling the two mounting holes with a fixing glue for fixing the single-mode optical fiber;
   assembling the first substrate and the sidewall of the liquid crystal cell to form a receiving box, wherein the first alignment layer of the first substrate faces the single-mode optical fiber;
   dropping the liquid crystal molecules into the receiving box; and
   assembling the second substrate and the receiving box such that the second alignment layer of the second substrate faces the single-mode optical fiber.

* * * * *